(12) United States Patent
Fang et al.

(10) Patent No.: US 10,718,613 B2
(45) Date of Patent: Jul. 21, 2020

(54) GROUND-BASED SYSTEM FOR GEOLOCATION OF PERPETRATORS OF AIRCRAFT LASER STRIKES

(71) Applicant: Massachusetts Institute of Technology, Cambridge, MA (US)

(72) Inventors: Julia A. Fang, Cambridge, MA (US); Brian Saar, Somerville, MA (US); Tom Reynolds, Brookline, MA (US); James K. Kuchar, Concord, MA (US); Richard Charles Westhoff, Hudson, NH (US); Erin Tomlinson, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 555 days.

(21) Appl. No.: 15/392,091

(22) Filed: Dec. 28, 2016

(65) Prior Publication Data
US 2018/0010911 A1    Jan. 11, 2018

Related U.S. Application Data

(60) Provisional application No. 62/324,427, filed on Apr. 19, 2016.

(51) Int. Cl.
*G01C 3/08* (2006.01)
*G01C 3/18* (2006.01)
*G01S 5/20* (2006.01)

(52) U.S. Cl.
CPC . *G01C 3/18* (2013.01); *G01S 5/20* (2013.01)

(58) Field of Classification Search
CPC ....... G01C 3/18; G01S 7/4804; G01S 7/4806; G06T 7/85; G06T 7/285; G06T 7/292; G06T 7/593

USPC ................................................ 356/3.01–5.15
See application file for complete search history.

(56) References Cited

U.S. PATENT DOCUMENTS

| | | | | |
|---|---|---|---|---|
| 5,699,245 A * | 12/1997 | Herold | ..................... | G01W 1/16 702/4 |
| 6,770,865 B2 * | 8/2004 | Wootton | ................. | G01S 3/783 250/216 |
| 7,339,148 B2 * | 3/2008 | Kawano | ............... | G02B 21/002 250/201.3 |
| 7,773,204 B1 * | 8/2010 | Nelson | ..................... | G01S 13/48 356/5.02 |
| 8,730,457 B2 * | 5/2014 | Rothenberger | ....... | G01S 7/4817 356/3.01 |

(Continued)

FOREIGN PATENT DOCUMENTS

WO     2006110973 A1    10/2006

OTHER PUBLICATIONS

Notification of Transmittal of the International Search Report and Written Opinion for PCT/US2017/019630 dated May 10, 2017.

(Continued)

*Primary Examiner* — Samantha K Abraham
(74) *Attorney, Agent, or Firm* — Daly, Crowley, Mofford & Durkee LLP (57) ABSTRACT

Laser light source geolocation. The system includes two spaced-apart ground based sensors for receiving light from a laser source that has been off-axis scattered by air molecules and particulates to form scattered light imagery. A processor operates on the imagery from the two sensors to geolocate the laser light source on the ground.

19 Claims, 6 Drawing Sheets

(56) References Cited

U.S. PATENT DOCUMENTS

| | | | |
|---|---|---|---|
| 9,536,320 B1* | 1/2017 | Prince | G06K 9/00335 |
| 9,639,760 B2* | 5/2017 | Ottlik | G08B 13/19652 |
| 2004/0095626 A1* | 5/2004 | Brady | G06T 11/005 |
| | | | 359/237 |
| 2006/0085130 A1 | 4/2006 | Belenkii | |
| 2008/0015771 A1* | 1/2008 | Breed | B60N 2/2863 |
| | | | 701/300 |
| 2008/0037829 A1* | 2/2008 | Givon | G06K 9/3216 |
| | | | 382/107 |
| 2010/0053330 A1* | 3/2010 | Hellickson | G01S 17/023 |
| | | | 348/153 |
| 2012/0044476 A1* | 2/2012 | Earhart | G01S 3/7867 |
| | | | 356/4.01 |
| 2012/0087212 A1* | 4/2012 | Vartanian | G01S 15/08 |
| | | | 367/118 |
| 2013/0250112 A1* | 9/2013 | Breed | B60R 19/205 |
| | | | 348/148 |
| 2013/0264463 A1* | 10/2013 | Martin | B64G 3/00 |
| | | | 250/206.2 |
| 2013/0314694 A1* | 11/2013 | Tchoryk, Jr. | G01S 17/95 |
| | | | 356/28.5 |
| 2014/0334554 A1 | 11/2014 | Walsh et al. | |
| 2015/0015869 A1* | 1/2015 | Smith | G01S 17/023 |
| | | | 356/28.5 |
| 2016/0041266 A1* | 2/2016 | Smits | G01S 17/66 |
| | | | 356/5.01 |
| 2016/0077207 A1* | 3/2016 | Freeman | G01S 15/66 |
| | | | 356/4.01 |
| 2016/0261300 A1* | 9/2016 | Fei | H04W 4/70 |
| 2016/0291117 A1* | 10/2016 | Hui | G01S 5/20 |
| 2017/0336326 A1* | 11/2017 | Sirat | G02B 21/0056 |
| 2018/0031737 A1* | 2/2018 | Murphy | G01W 1/16 |
| 2019/0004178 A1* | 1/2019 | Motoyama | G01B 21/00 |

OTHER PUBLICATIONS

Lillard et al. Minimum variance missile launch and impact estimation by fusing observations from multiple sensors. 1997. [retrieved on Apr. 18, 2017] Retrieved from the internet: <URL :http:/ /i eeexpl ore. ieee .org/document/57 4879/?section=abstract>.

* cited by examiner

GROUND-BASED SYSTEM FOR GEOLOCATION OF PERPETRATORS OF AIRCRAFT LASER STRIKES

This application claims priority to provisional patent application Ser. No. 62/324,427 filed on Apr. 19, 2016, the contents of which are incorporated herein by reference in its entirety.

This invention was made with government support under contract number FA8721-05-C-0002 awarded by the US Air Force. The government has certain rights in the invention.

BACKGROUND OF THE INVENTION

This invention relates to a ground-based system to locate perpetrators of aircraft laser strikes.

Laser strikes against commercial aircraft are a growing problem in the United States. In the last decade there has been a large increase in the number of incidents reported to the Federal Aviation Administration, likely driven by the increasing availability of high power, low cost laser pointers. Reports increased rapidly in 2015, with 7,703 incidents compared to 3,894 in 2014.

Impacts to the pilot include distraction, loss of night vision, temporary flash blindness and retinal burning. These effects generally happen during the most critical takeoff and landing phases of flight when the aircraft are closest to the ground, and as a result they pose a serious safety hazard that has many public officials very concerned.

Current responses to these incidents are limited. For persistent incidents in a given location, air traffic controllers may change departure and landing patterns to avoid areas where laser strikes have been reported. For more egregious incidents, police helicopters may be deployed to try to find the perpetrator on the ground using the helicopter's onboard infrared sensors. Currently, this is the only way for law enforcement to locate and stop a perpetrator from future incidents, but very few perpetrators have been apprehended to date.

An object of the present invention is a ground-based system to automatically detect laser streaks and geolocate their origin, with coupling to an alerting system to allow a rapid law enforcement response and a post-event analysis system to support prosecution. The system disclosed herein holds the promise of persistent protection of high criticality air space around an airport which will lead to significantly greater potential for perpetrator apprehension and prosecution, with associated strong deterrent effects.

SUMMARY OF THE INVENTION

The system according to the invention for geolocation of a laser light source includes at least two spaced-apart ground-based sensors for receiving light from the laser source that has been off-axis scattered by air molecules and particulates to form imagery from the scattered light; and a processor operating on the scattered light imagery from the two sensors to locate the laser source. In a preferred embodiment, the sensors comprise a large aperture lens including a laser line or passband filter delivering light to a cooled charge coupled device (CCD) camera. A suitable lens aperture is 10 centimeters. It is preferred that the cooled CCD camera be astronomy grade. In another embodiment, the imagery is a plane of interest outward from each sensor. It is preferred that the processor forms a vector from intersection of planes of interest from the two sensors, which gets propagated to the ground using a terrain map to establish laser origin coordinates. Post-event algorithms can be used to overlay laser beam direction with aircraft coordinates to aid prosecution activities.

DESCRIPTION OF THE PREFERRED EMBODIMENT

The system disclosed herein for geolocation of a laser light source uses two or more ground-based sensors that monitor the sky typically around a final approach or departure path with respect to an airport runway. When a laser beam enters a region protected by the present invention, the sensors will detect an off-axis scatter streak from the laser beam as photons scatter from air molecules and particulates. These photons are detected by sensors and software converts the detected streak into a plane of interest outward from each sensor. The vector formed by the intersection of the two planes from the two sensors is the location of the actual beam, and that vector is followed to the ground to find the perpetrator's location. With real time processing and a system to properly alert appropriate authorities, an accurate geolocation of the perpetrator is available to law enforcement within seconds.

Figure 1:
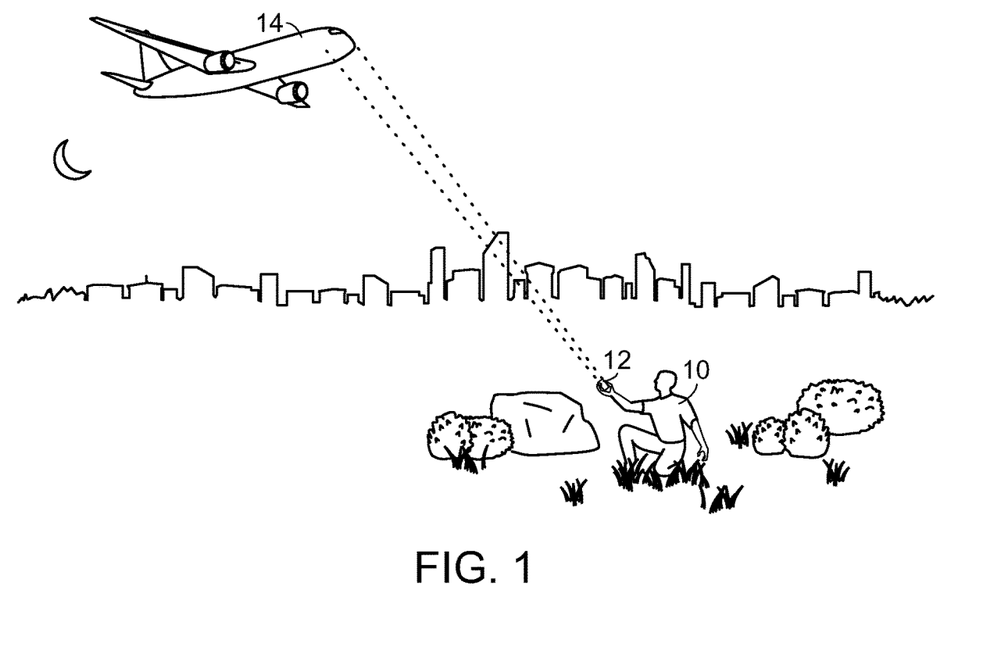
FIG. 1 is a schematic illustration of the laser strike phenemon disclosed herein.
Figure 2:
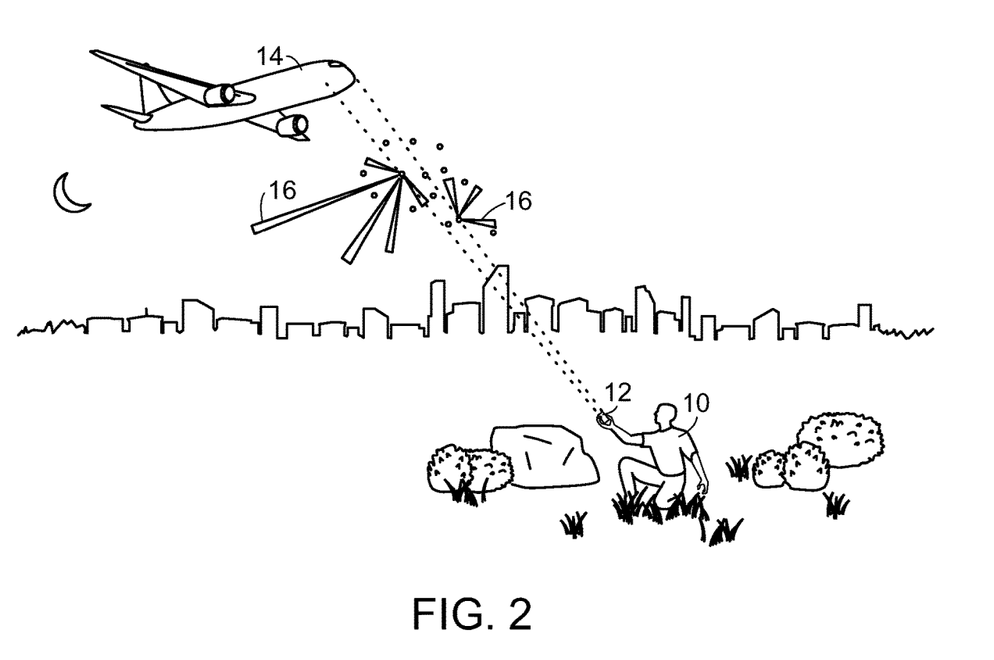
FIG. 2 is a schematic illustration showing light from a laser scattered from air molecules and/or particulates.
Figure 3:
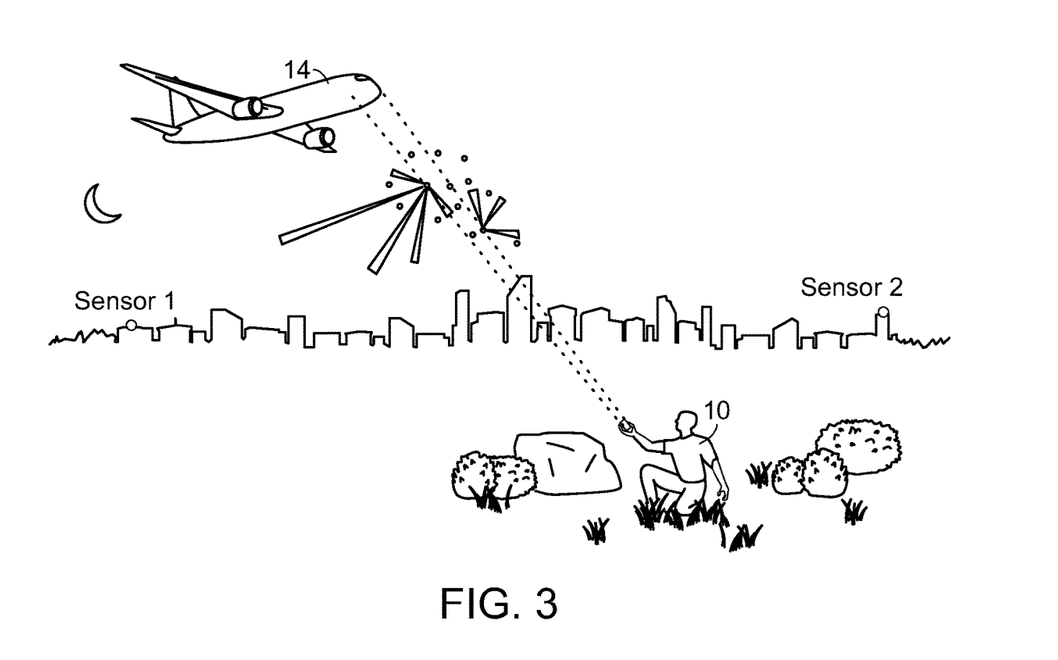
FIG. 3 is a schematic illustration showing the location of two geographically spaced-apart sensors for receiving the scattered light.
Figure 4:
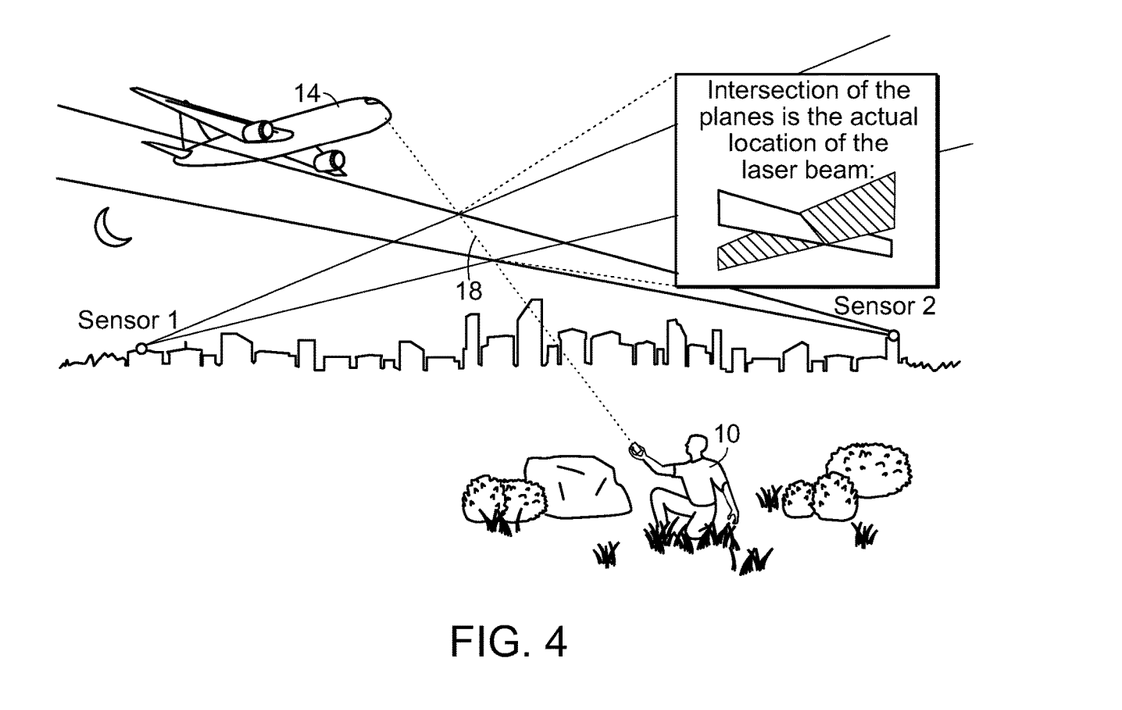
FIG. 4 is a schematic illustration showing the intersection of planes to form a vector for geolocation of a perpetrator.

With reference first to FIG. 1, a perpetrator 10 is shining a laser light source 12 at an airplane 14. As shown in FIG. 2, light from the laser light source 12 is scattered off-axis as shown at 16. The scattered light 16 is received by sensor 1 and sensor 2 shown in FIG. 3. As shown in FIG. 4 the laser light received by sensor 1 and sensor 2 intersect to form a vector 18 which is in the direction of the laser beam.

Figure 5:
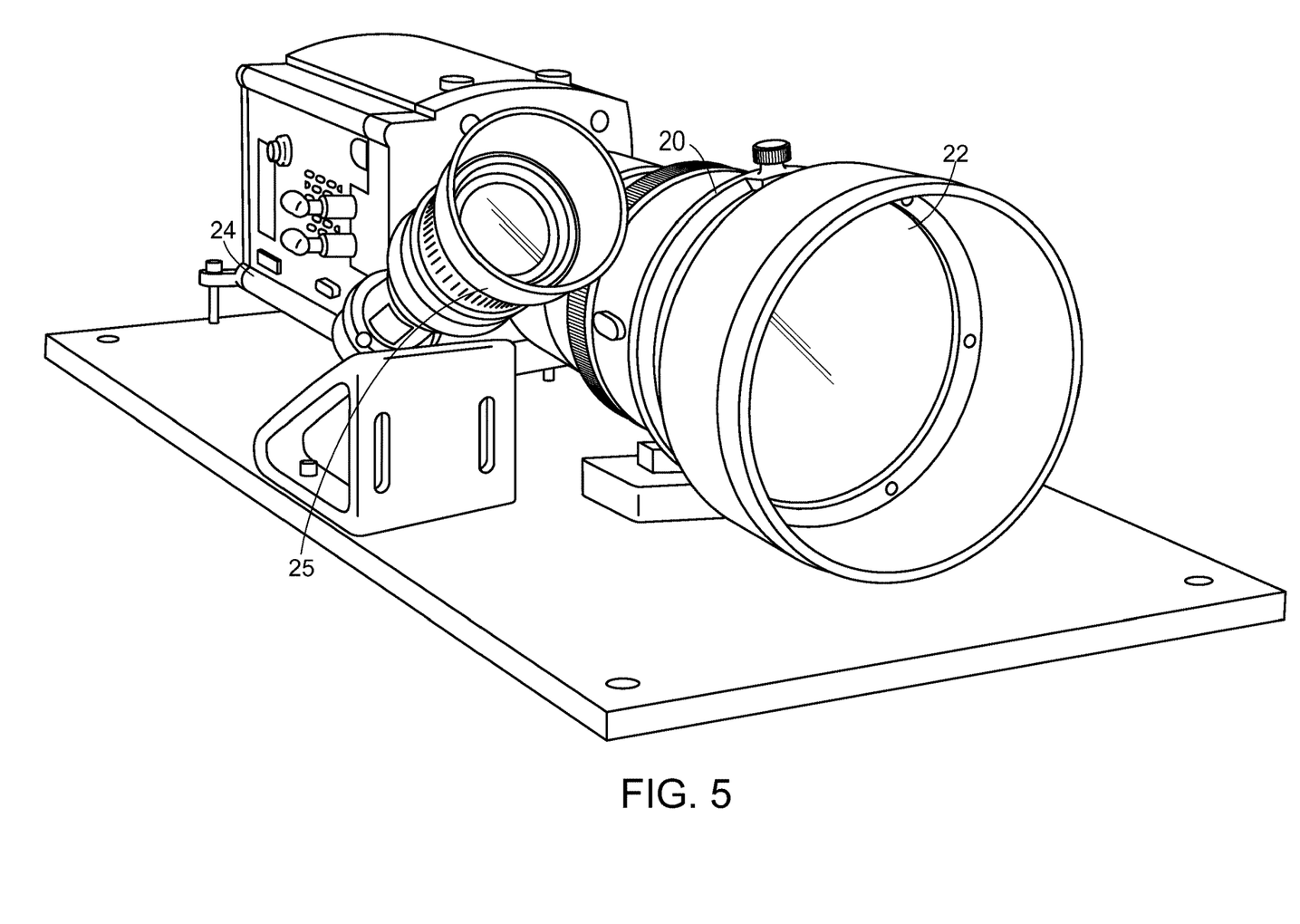
FIG. 5 is a perspective view of an embodiment of a sensor for use with the present invention.
Figure 6:
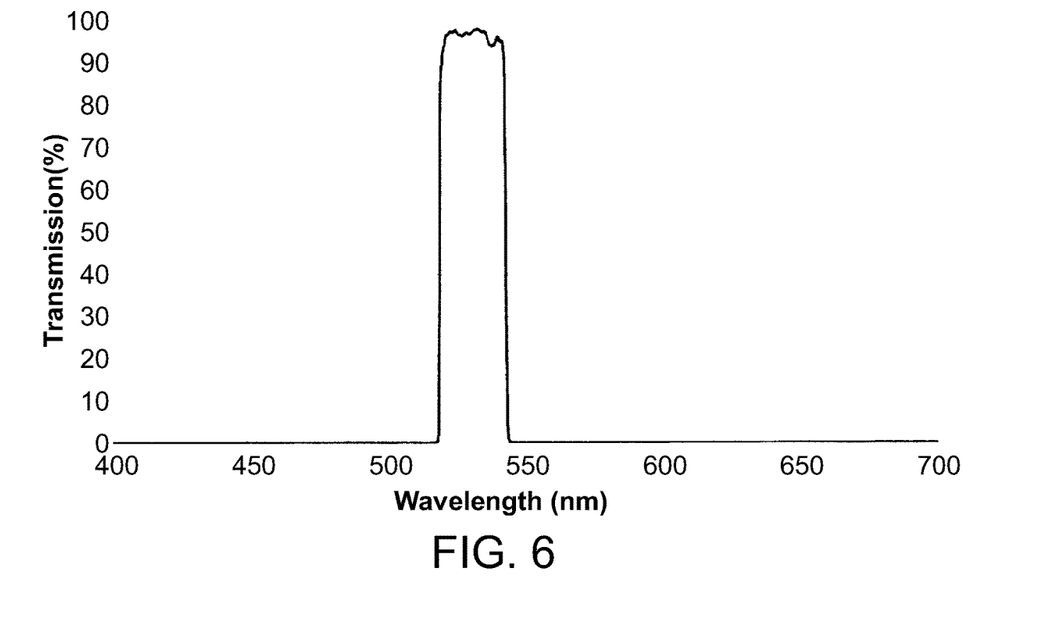
FIG. 6 is a graph of transmission against wavelength for a commercial broad passband filter.
Figure 7:
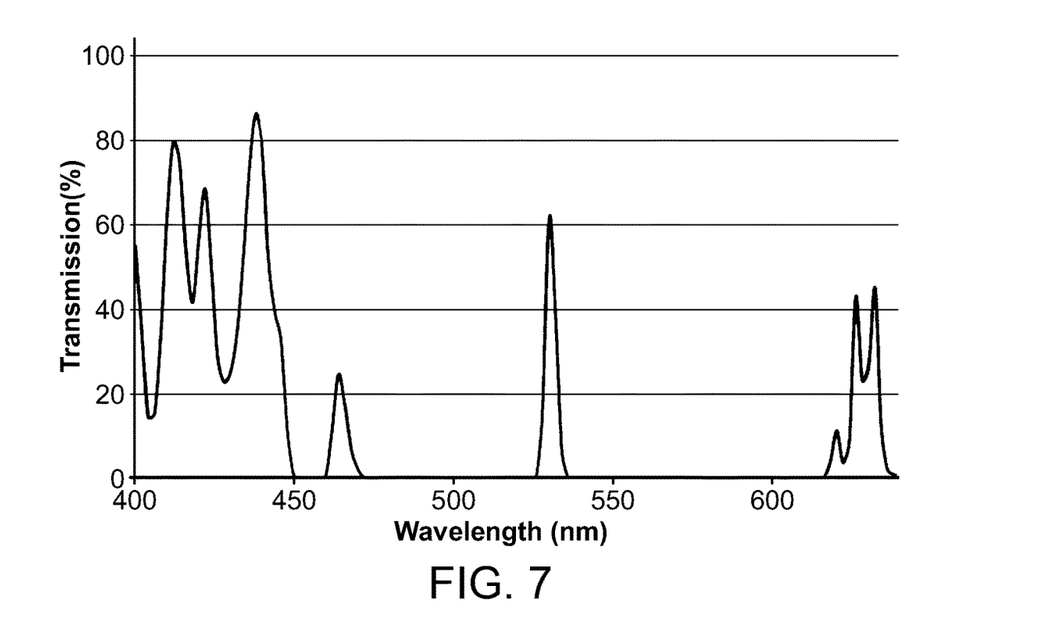
FIG. 7 is a graph of transmission against wavelength of a custom narrow passband filter showing out of band transmission.
Figure 8:
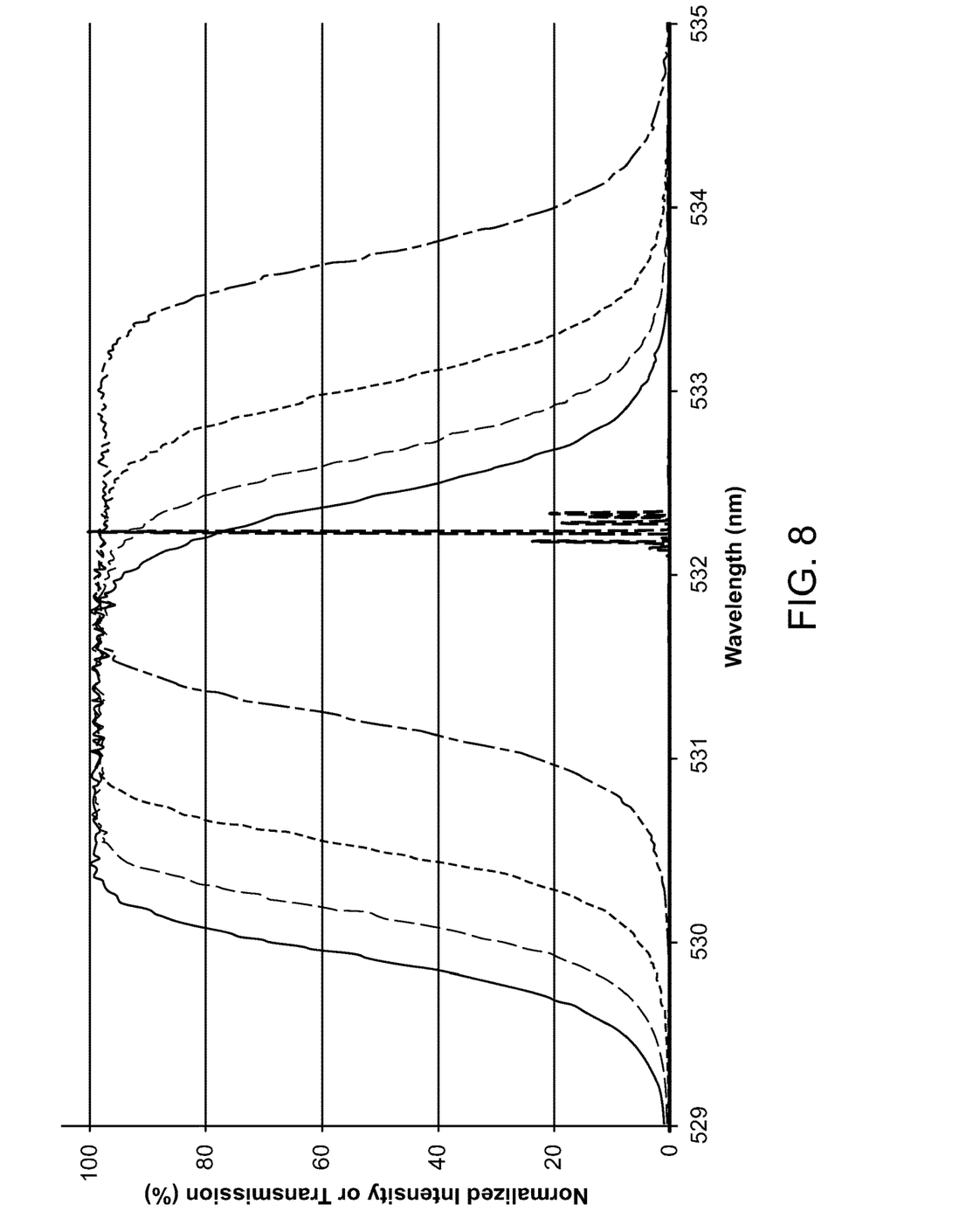
FIG. 8 is a graph of normalized intensity of transmission against wavelength of a custom narrow band filter compared with a green laser pointer signal illustrating a method of reducing signal-to-noise ratio by narrowing the transmission window.

FIG. 5 illustrates a preferred sensor embodiment for use with the present invention. As shown in FIG. 5, a lens 20 includes a passband (or laser line) filter 22 that is usually a green filter but may be tuned to any laser color. It is preferred that the passband filter 22 comprise two filters, one with a broad passband of 10-18 nm as shown in FIG. 6 and another one with a narrow passband of 0.5-4 nm as shown in FIG. 7. The wider filter is used to remove out of band transmission that is difficult/expensive to filter out using just the narrow band filter. Signal to noise ratio can be increased by narrowing the passband of the narrow band filter to reduce background light and noise as illustrated in FIG. 8. The filter 22 blocks irrelevant wavelengths of light such as sky background light thereby lowering the noise in the image. The lens 20 is a large, commercially available lens (e.g., 10 cm aperture). The lens 20 is coupled to an appropriate low noises high sensitivity sensor capable of detecting single photons of light such as a cooled CCD camera 24 having an astronomy-grade rating. The attitude of the resulting sensor needs to be established to high accuracy. The current embodiment uses an off-axis star tracker 25 to calibrate accurately the sensor attitude, but approaches that use terrestrial landmarks may also be appropriate.

Figure 9:
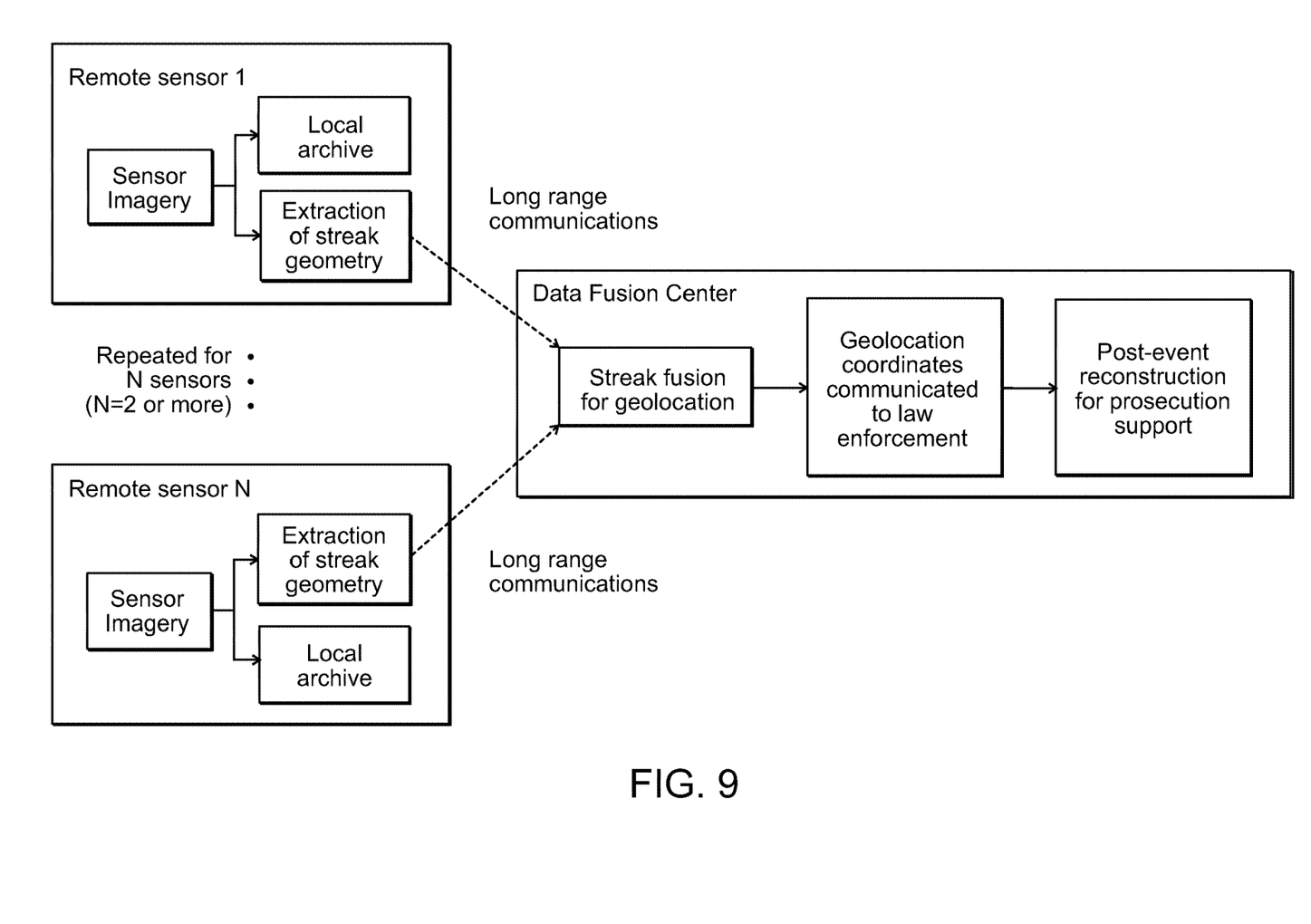
FIG. 9 is a block diagram of the process for extracting geolocation of a perpetrator from the scattered light.

FIG. 9 is a block diagram showing one approach for extracting geolocation from the scattered light images. As shown in FIG. 9, each remote sensor site extracts streak geometry from the scattered light image. This streak geometry is then processed in a data fusion center for geolocation. Once the location of the laser is determined, geolocation coordinates are communicated to law enforcement for apprehending the perpetrator. Laser streak origin, azimuth and elevation characteristics can be used to locate the laser streak in space and time which can then be overlaid with flight track data to produce prosecution evidence, such as animations of aircraft and laser streak movement, and calculations of closest point of approach between the laser beam and the aircraft.

The image processing system used in the invention includes a first stage for signal detection and characterization and a second stage for signal synthesis and geolocation. In stage 1, images are processed to improve the signal-to-noise ratio. Processing steps in this stage include: frame stacking (image summing), background subtraction, pixel re-binning, spatial or temporal filtering and thresholding. The processed images are analyzed via Hough transform to identify line segments in the image that could potentially be laser strikes. Basic features of the detected line segments are used to rule out obvious false positives such as, for example, line segments that are horizontal or are shorter than a certain number of pixels, the slopes of both line segments differ by more than is physically allowed by our sensor baseline geometry.

The pixels that comprise the detected line segment are passed through a weighted-least-squares linear regression algorithm to determine the position and orientation of the line in pixel-space with greater accuracy than is afforded by the Hough transform. The weights are chosen to be a function of the pixel value, i.e., pixels with a higher photon count are given more weight in the regression. The center of each pixel is assigned a local azimuth and elevation value based on a pre-calibrated azimuth and elevation of the image center and the instantaneous field of view (IFOV) of the sensor. The local spherical coordinates of the two outermost points of the detected line segment are recorded and stored for further processing. An initial guess for the slant range of each detection point is recorded in place of the correct value. The two outermost points of the detected line segment and the known sensor location form a triplet of points that form a unique plane.

In the second stage, the two planes detected and characterized in stage 1 intersect along a single line (the true location of the laser streak). The equation for this line is found using planar geometry. The line is extrapolated down to the point at which it intersects the surface of the Earth. The surface of the Earth is modeled by placing digital terrain elevation data (DTED) on top of an appropriately-chosen reference ellipsoid and geoid. The longitude, geodetic latitude and ellipsoidal height of the point of intersection gives the predicted location of the perpetrator (the origin of the detected laser streak).

These spatial coordinates, together with the equation for laser streak, allow one to calculate other quantities of interest, such as the local direction (azimuth and elevation) that the laser was pointing and the precise distance to the perpetrator. The details about the laser strike event, together with the timestamps associated with each image, are correlated with recorded aircraft tracks to provide strong evidence for law enforcement that the perpetrator was attempting to laser an aircraft.

Those of ordinary skill in the art will recognize that the sensors can be affixed to motorized mounts that can tilt the camera up/down in elevation as well as rotating in azimuth either to orient the sensors for different runways, and/or to automatically track aircraft. The field of view of a camera presents a tradeoff between accuracy of geolocation (preferring narrow FOV) and ability to cover a large geographic area with the intersection of the FOV of two cameras (preferring wide FOV). In a preferred embodiment, this tradeoff can be improved by pointing the two or more sensors using a moving mount and observing areas in which laser strikes are most likely to occur such as directly beneath an aircraft during approach or departure.

It is noted that the system disclosed herein can also be used to geolocate perpetrators of strikes against targets other than aircraft, including chips, surface vehicles and individuals.

It is recognized that modifications and variations on the present invention will be apparent to those of ordinary skill in the art and it is intended that all such modifications and variations be included within the scope of the appended claims.

What is claimed is:

1. A system for geolocation of a laser light source, the system comprising:
a plurality of spaced-apart, ground-based sensors, each sensor of the plurality configured for receiving light from the laser light source that has been off-axis scattered, and for determining, from the received light, a unique plane in space that intersects both the sensor and the light from the laser light source; and
a processor configured for receiving, from each sensor of the plurality using long range communications, data indicating a geometry of the unique plane determined by the sensor, and for determining a geolocation of the laser light source by computing an intersection of the unique planes to form a line in space, and extrapolating the line, so formed, to the surface of the Earth.

2. The system of claim 1 wherein at least one sensor of the plurality comprises a lens including a laser line filter.

3. The system of claim 2 wherein the lens has a 10 cm aperture.

4. The system of claim 1 wherein at least one sensor of the plurality includes a cooled CCD camera.

5. The system of claim 1, wherein at least one sensor of the plurality is sensitive to detect single photons of light.

6. The system of claim 1, wherein at least one sensor of the plurality is configured to determine the unique plane in space by forming a processed image from the received light by performing one or more of: frame stacking, image summing, background subtraction, pixel re-binning, spatial filtering, temporal filtering, and thresholding.

7. The system of claim 6, wherein the at least one sensor of the plurality is configured to determine the unique plane in space by performing a Hough transform on the processed image to identify a line segment that is a candidate laser strike.

8. The system of claim 7, wherein the at least one sensor of the plurality is configured to rule out the line segment as a candidate laser strike when the line segment is either horizontal or is shorter than a given number of pixels.

9. The system of claim 7, wherein the at least one sensor of the plurality is configured to determine the unique plane in space by performing a weighted-least-squares linear regression on the line segment to determine a position and orientation of the line segment.

10. The system of claim 9, wherein the at least one sensor of the plurality is configured to give each pixel in the line segment a regression weight, and wherein pixels with a higher received photon count are given a higher regression weight.

11. The system of claim 1, wherein the processor is further configured for:
 receiving data including receiving, from each of the two or more sensors of the plurality, a timestamp associated with a corresponding unique plane; and
 correlating the received timestamps with a recorded track of an aircraft to determine whether and when the laser light source lased the aircraft.

12. A method of geolocating a laser light source, the method comprising:
 receiving, in each of a plurality of spaced-apart, ground-based sensors, light from the laser light source that has been off-axis scattered;
 by each sensor of the plurality, determining, from the received light, a unique plane in space that intersects both the sensor and the light from the laser light source;
 receiving, in a processor from each sensor of the plurality using long range communications, data indicating a geometry of the unique plane determined by the sensor; and
 by the processor, determining a geolocation of the laser light source by computing an intersection of the unique planes to form a line in space, and extrapolating the line, so formed, to the surface of the Earth.

13. The method according to claim 12, wherein processing the received light comprises forming a processed image from the received light by performing one or more of: frame stacking, image summing, background subtraction, pixel re-binning, spatial filtering, temporal filtering, and thresholding.

14. The method according to claim 13, further comprising performing a Hough transform on the processed image to identify a line segment that is a candidate laser strike.

15. The method according to claim 14, further comprising ruling out the line segment as a candidate laser strike when the line segment is either horizontal or is shorter than a given number of pixels.

16. The method according to claim 14, further comprising performing a weighted-least-squares linear regression on the line segment to determine a position and orientation of the line segment.

17. The method according to claim 16, wherein each pixel in the line segment is given a regression weight, and pixels with a higher received photon count are given a higher regression weight.

18. The method according to claim 12, wherein receiving the data further comprises receiving, from each of the two or more sensors of the plurality, a timestamp associated with the corresponding unique plane.

19. The method according to claim 18, further comprising correlating the received timestamps with a recorded track of an aircraft to determine whether and when the laser light source lased the aircraft.

* * * * *